(12) United States Patent
Ziemer et al.

(10) Patent No.: US 10,876,600 B2
(45) Date of Patent: Dec. 29, 2020

(54) MULTISPEED TRANSMISSION

(71) Applicant: ZF Friedrichshafen AG, Friedrichshafen (DE)

(72) Inventors: Peter Ziemer, Tettnang (DE); Kai Bornträger, Langenargen (DE); Christoph Margraf, Markdorf (DE); Andreas Beisswenger, Friedrichshafen (DE); Stefan Brom, Canton, OH (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/348,528

(22) PCT Filed: Nov. 9, 2017

(86) PCT No.: PCT/EP2017/078708
§ 371 (c)(1),
(2) Date: May 9, 2019

(87) PCT Pub. No.: WO2018/087206
PCT Pub. Date: May 17, 2018

(65) Prior Publication Data
US 2019/0293154 A1    Sep. 26, 2019

(30) Foreign Application Priority Data
Nov. 11, 2016   (DE) .................. 10 2016 222 222

(51) Int. Cl.
*F16H 3/66*   (2006.01)
(52) U.S. Cl.
CPC .............. *F16H 3/666* (2013.01); *F16H 3/66* (2013.01); *F16H 2200/0026* (2013.01);
(Continued)

(58) Field of Classification Search
CPC ............... F16H 3/66; F16H 2200/2046; F16H 2200/2015; F16H 2200/0078; F16H 2200/0026
(Continued)

(56) References Cited

U.S. PATENT DOCUMENTS 4,531,428 A * 7/1985 Windish .................... F16H 3/66
                                                                    475/279
6,634,980 B1   10/2003 Ziemer
(Continued)

FOREIGN PATENT DOCUMENTS

DE         3534971 A1 *  4/1986  ......... F16H 61/0213
DE       199 49 507 A1    4/2001
(Continued)

OTHER PUBLICATIONS

German Search Report Corresponding to 10 2016 222 228.7 dated May 8, 2017.
(Continued)

*Primary Examiner* — Roger L Pang
(74) *Attorney, Agent, or Firm* — Davis & Bujold PLLC; Michael J. Bujold

(57) ABSTRACT

A multi-speed transmission having drive and output shafts, three front-mounted and two rear-mounted planetary gearsets, six shift elements which are selectively engaged to render a speed of the drive shaft and speeds generated in the front gearsets to achieve at least one reverse and twelve forward gears via at least one of the rear gearsets transmissible as the output shaft speed. Four shift elements are assigned to the front gearsets and two shift elements are assigned to the rear gearsets. At least one of the front gearsets is fixed to an element of the rear gearsets, resulting in six different output speeds of the front gearsets being transmissible to at least one of the rear gearsets. If normal- (Continued)

ized to the input speed of the drive shaft, one of the six output speeds is less than 0, four are between 0 and 1, and one is equal to 1.

11 Claims, 2 Drawing Sheets

(52) U.S. Cl.
CPC ............... *F16H 2200/0078* (2013.01); *F16H 2200/2015* (2013.01); *F16H 2200/2046* (2013.01)

(58) Field of Classification Search
USPC .......................................... 475/275–291, 330
See application file for complete search history.

(56) References Cited

U.S. PATENT DOCUMENTS

| | | | |
|---|---|---|---|
| 6,960,149 | B2 | 11/2005 | Ziemer |
| 8,517,885 | B2 | 8/2013 | Shim et al. |
| 9,163,705 | B1 | 10/2015 | Hwang et al. |
| 9,822,856 | B2 | 11/2017 | Hoffman |
| 2019/0056015 | A1* | 2/2019 | Kook ................. F16H 3/663 |
| 2019/0293153 | A1* | 9/2019 | Ziemer ................. F16H 3/66 |

FOREIGN PATENT DOCUMENTS

| | | |
|---|---|---|
| DE | 10 2011 056 897 A1 | 3/2013 |
| DE | 10 2015 213 067 A1 | 1/2014 |
| DE | 10 2014 214 212 A1 | 1/2015 |
| DE | 20 2015 004 910 U1 | 9/2015 |
| DE | 10 2014 117 679 A1 | 3/2016 |
| EP | 1 373 756 B1 | 4/2012 |
| JP | 2005-172123 A | 6/2005 |
| JP | 2014-224547 A | 12/2014 |
| WO | 02/079669 A1 | 10/2002 |

OTHER PUBLICATIONS

German Search Report Corresponding to 10 2016 222 226.0 dated May 8, 2017.
German Search Report Corresponding to 10 2016 222 222.8 dated May 8, 2017.
International Search Report Corresponding to PCT/EP2017/077061 dated Jan. 29, 2018.
International Search Report Corresponding to PCT/EP2017/078693 dated Jan. 31, 2018.
International Search Report Corresponding to PCT/EP2017/078708 dated Jan. 29, 2018.
Written Opinion Corresponding to PCT/EP2017/077061 dated Jan. 29, 2018.
Written Opinion Corresponding to PCT/EP2017/078693 dated Jan. 31, 2018.
Written Opinion Corresponding to PCT/EP2017/078708 dated Jan. 29, 2018.

* cited by examiner

| gear | A | B | C | D | E | F | gear ratio | efficiency | gear increment | |
|---|---|---|---|---|---|---|---|---|---|---|
| R |   | o | o | o |   |   | -7.55 | 0.921 | | |
|   |   |   |   |   |   |   |   |   | -0.74 R/1 | |
| N |   |   | o | o |   |   | — | — | | |
|   |   |   |   |   |   |   |   |   | -1.11 R/2 | |
| G1 |   |   | o | o | o |   | 10.14 | 0.964 | | |
|   |   |   |   |   |   |   |   |   | 1.49 | |
| G2 | o |   | o | o |   |   | 6.79 | 0.972 | | |
|   |   |   |   |   |   |   |   |   | 1.68 | |
| G3 | o |   | o |   | o |   | 4.05 | 0.966 | | |
|   |   |   |   |   |   |   |   |   | 1.52 | |
| G4 | o | o | o |   |   |   | 2.66 | 0.975 | | |
|   |   |   |   |   |   |   |   |   | 1.51 | |
| G5 |   | o | o |   | o |   | 1.76 | 0.986 | | |
|   |   |   |   |   |   |   |   |   | 1.36 | |
| G6 |   |   | o |   | (o) | o | 1.29 | 0.995 | | |
|   |   |   |   |   |   |   |   |   | 1.29 | |
| G7 |   | o |   |   | o | o | 1.00 | 1.0 | | |
|   |   |   |   |   |   |   |   |   | 1.21 | |
| G8 | o | o |   |   |   | o | 0.83 | 0.992 | | |
|   |   |   |   |   |   |   |   |   | 1.12 | 1.21 |
| G9 | o |   |   | o |   | o | 0.74 | 0.990 | | |
|   |   |   |   |   |   |   |   |   | 1.08 | |
| G10 | o |   |   | o |   | o | 0.68 | 0.992 | 1.12 | |
|   |   |   |   |   |   |   |   |   | 1.04 | |
| G11 |   |   |   | o | o | o | 0.66 | 0.992 | | 1.21 |
|   |   |   |   |   |   |   |   |   | 1.17 | |
| G12 |   | o |   | o |   | o | 0.56 | 0.985 | | |
|   |   |   |   |   |   |   |   |   | ratio spread 2 - 12 | 12.0 |
|   |   |   |   |   |   |   |   |   | ratio spread 1 - 12 | 18.0 |

In the 6th gear B or A or D can be engaged instead of E

MULTISPEED TRANSMISSION

This application is a National Stage completion of PCT/EP2017/078708 filed Nov. 9, 2017, which claims priority from German patent application serial no. 10 2016 222 222.8 filed Nov. 11, 2016.

FIELD OF THE INVENTION

This invention relates to a multi-speed transmission.

BACKGROUND OF THE INVENTION

For instance, from document EP 1 373 756 B1 a multi-speed transmission is known as an automatic transmission, in which, for instance, two front-mounted gear sets and two rear-mounted gear sets are provided, to which seven shift elements are assigned, wherein only eleven forward gears and one reverse gear can be achieved, however. A connecting shaft is used to permanently connect the front-mounted gear sets to the rear-mounted gear sets. Further, the rear-mounted gear sets can be connected to the drive shaft as a shift element via a shaft and a clutch and can be fixed via a further shaft and a brake as a further shift element, such that the two rear-mounted gear sets in at least three of the forward gears simultaneously transfer torque. For that reason, the number of gears is limited in spite of the large number of components required, such as the seven shift elements.

SUMMARY OF THE INVENTION

This invention addresses the problem of providing a multi-speed transmission of the type described above, having a maximum number of gears and a design that is structurally as simple as possible.

According to the invention, this problem is solved by the features of the independent claims, wherein advantageous embodiments are presented in the subclaims, the description and the drawings.

Thus, a multi-speed transmission is proposed as an automatic transmission, in particular for vehicles, which transmission has a drive shaft and an output shaft and a first front-mounted gear set, a second front-mounted gear set and a third front-mounted gear set. Further, a first rear-mounted gear set and a second rear-mounted gear set are provided. The front-mounted gear sets and the rear-mounted gear sets are each designed as planetary gear sets. Moreover, only 6 shift elements are provided in the multi-speed transmission, the selective engaging of which can be used to transmit a drive speed of the drive shaft and speeds generated in the front-mounted gear sets selectively to achieve at least 12 forward gears and at least one reverse gear to the output shaft as output speed via at least one of the rear-mounted gear sets. Four shift elements are assigned to the front-mounted gear sets and two shift elements are assigned to the two rear-mounted gear sets. At least one of the front-mounted gear sets is rigidly tied to an element of the rear-mounted gear sets such that six different output speeds of the front-mounted gear sets can be transferred to at least one of the rear-mounted gear sets, wherein, if normalized to the input speed of the drive shaft, one of the output speeds is smaller than 0, four output speeds are between 0 and 1, and one output speed is equal to 1, i.e. is equal to the drive speed.

In this way, a multi-speed transmission is proposed as an automatic transmission, in which at least twelve forward gears and one reverse gear are provided based on a structurally simpler design, wherein in addition one particularly short first gear can be implemented, the maximum number of single gear sets being five and the maximum number of shift elements being six. Thus, in contrast to known multi-speed transmissions, additional speeds are implemented and at the same time the number of shift elements is reduced. Consequently, the proposed multi-speed transmission allows for a maximum number of speeds at a structurally simple design and optimized difference between gear ratios.

Preferably, in the multi-speed transmission according to the invention, only three of the shift elements are designed as clutches and three shift elements are designed as brakes. This results in a further advantage where installation space is concerned, as the design of brakes is much simpler than that of clutches.

Because preferably two of the front-mounted gear sets are designed as 2-carrier 4-shaft gears and one of the front-mounted gear sets as a single gear set, the complexity of the design is further reduced. In a 2-carrier 4-shaft gear or arrangement provision is made that in each case two elements of the two gear sets are connected to each other, resulting in only four shafts being provided instead of the customary six shafts. In addition, if the two rear-mounted gear sets are also designed as 2-carrier 4-shaft gears, the design of the proposed gear set is further simplified and the overall manufacturing costs are further reduced.

In a further variant of the embodiment of the invention, provision can be made that the two rear-mounted gear sets are designed as so-called Simpson gear sets, resulting in significantly lower component stress in the main gear set or at the two rear-mounted gear sets.

A further embodiment of the invention may provide that the front-mounted gear sets are also designed as Simpson gear sets, resulting in significantly lower component stress in the front-mounted gear sets. This design can be used alternatively or in addition to the embodiments described above.

This multi-speed transmission according to the invention can generally be used in vehicles. A preferred application can provide that the multi-speed transmissions are used in vehicles that require a particularly short first gear or a so-called creep mode, such as in off-road vehicles or in utility vehicles, such as buses or the like.

BRIEF DESCRIPTION OF THE DRAWINGS

Below, this invention is explained with reference to the drawings. In the figures.

DETAILED DESCRIPTION OF THE PREFERRED EMBODIMENTS

Figure 1:
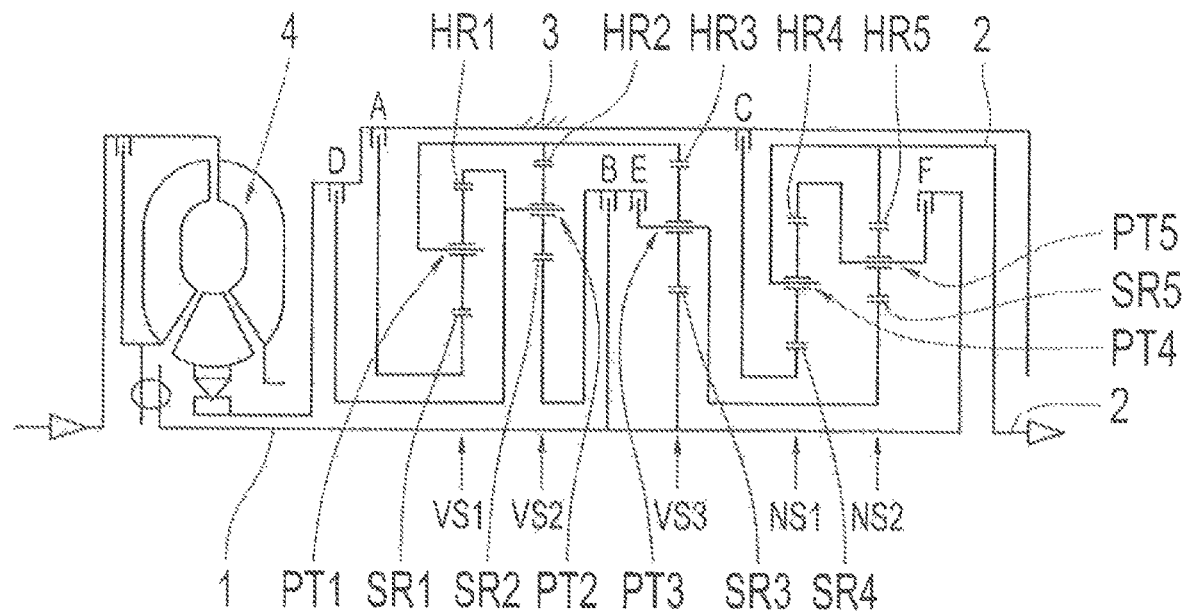
FIG. 1 shows a schematic view of a first variant of the embodiment of a multi-speed transmission according to the invention.
Figure 2:
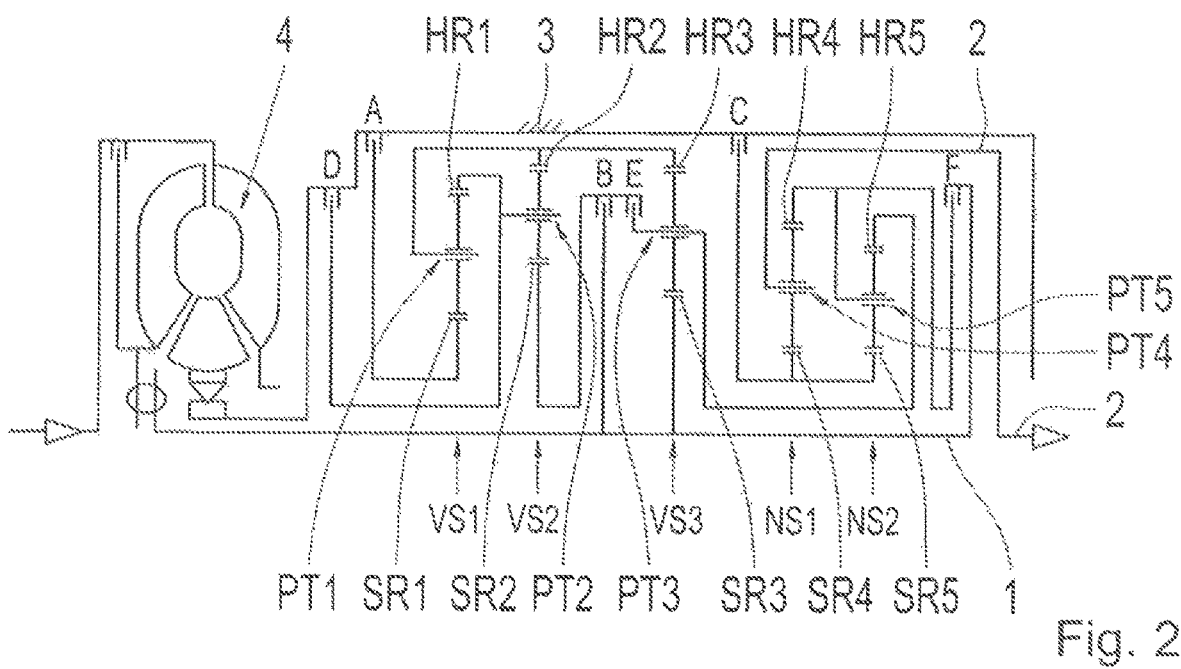
FIG. 2 shows a schematic view of a second variant of the embodiment of the multi-speed transmission, wherein the rear-mounted gear sets are designed as Simpson gear sets.
Figures 3, 4:
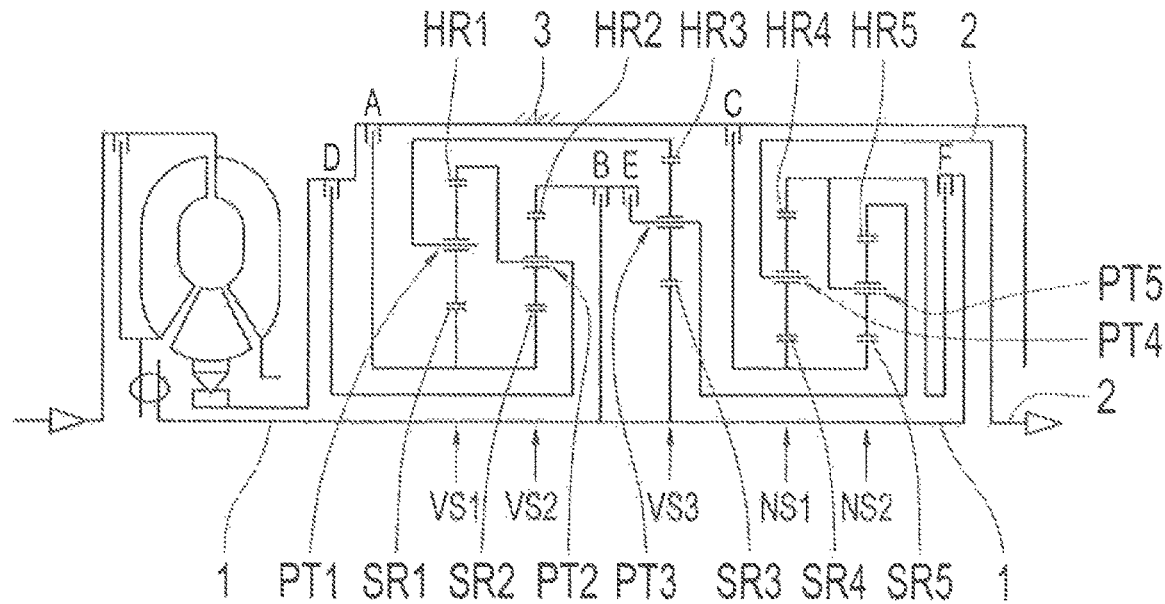
FIG. 3 shows a schematic view of a third variant of the embodiment of the multi-speed transmission according to the invention wherein the front-mounted gear sets are designed as Simpson gear sets.
FIG. 4 shows a shift diagram for the gear sets shown in FIGS. 1 to 3 by way of example.

In FIGS. 1 to 3, gear set diagrams of a multi-speed transmission of a vehicle having, for instance, 12 forward gears G1 to G12 and at least one reverse gear R are shown, wherein FIG. 4 shows a possible shift matrix or a possible shift diagram only as an example for gear set diagrams.

The multi-speed transmission designed as an automatic transmission comprises a drive shaft 1 and an output shaft 2, wherein the drive shaft 1 can preferably be coupled to a drive motor of the vehicle, for instance an internal combustion engine or the like, via a torque converter 4. Further, a first front-mounted gear set VS1, a second front-mounted gear set VS2 and a third front-mounted gear set VS3 and a first rear-mounted gear set NS1 and a second rear-mounted gear set NS2 are also provided, which are each designed as planetary gear sets. Moreover, only six shift elements A, B, C, D, E, F are provided, the selective engaging of which selectively renders a drive speed of the drive shaft 1 and speeds generated in the front-mounted gear sets VS1, VS2, VS3 to achieve at least twelve forward gears G1 to G12 and at least one reverse gear via at least one of the rear-mounted gear sets NS1, NS2 transmissible as the output speed to the output shaft 2.

The multi-speed transmission according to the invention provides that four shift elements A, B, D, E are assigned to the front-mounted gear sets VS1, VS2, VS3, wherein two shift elements C, F are assigned to the two rear-mounted gear sets NS1, NS2, and wherein the third front-mounted gear set VS3 is rigidly connected to an element of the rear-mounted gear sets NS1, NS2, such that six different output speeds of the front-mounted gear sets VS1, VS2, VS3 can be transmitted to at least one of the rear-mounted gear sets NS1, NS2. The output speeds of the front-mounted gear sets VS1, VS2, VS3 are normalized or correlated to the input speed of the drive shaft 1. One of the output speeds is smaller than 0. Four more output speeds are between 0 and 1 and another output speed is equal to 1.

At a value of 1, the output speed equals the drive speed. A front-mounted reduction gear set accordingly provides a normalized speed between 0 and 1. A front-mounted reversing gear set accordingly provides a normalized speed below 0.

Independent of the several variants of the embodiment, provision is made that a first shift element A is assigned as a brake, a second shift element B is assigned as a clutch, a fourth shift element D is assigned as a brake and a fifth shift element E is assigned as a clutch to the front-mounted gear sets VS1, VS2, VS3, and that a third shift element C is assigned as a brake and a sixth shift element F is assigned as a clutch to the rear-mounted gear sets NS1, NS2. Further, two of the front-mounted gear sets VS1, VS2, VS3 are designed as 2-carrier 4-shaft gears and one front-mounted gear set VS1, VS2, VS3 is designed as a single gear set and the two rear-mounted gear sets NS1, NS2 are designed as 2-carrier 4-shaft gears.

In detail, e.g. the first front-mounted gear set VS1 and the second front-mounted gear set VS2 are designed as a 2-carrier 4-shaft gears and the third front-mounted gear set VS3 is designed as a single gear, to which one of the rear-mounted gear sets NS1, NS2 is firmly connected.

In FIG. 1, a first exemplary embodiment of the proposed multi-speed transmission is shown, in which the drive shaft 1 is connected to a sun gear SR2 of the second front-mounted gear set VS2 when the second shift element B is engaged, wherein the drive shaft 1 and the sun gear SR2 of the second front-mounted gear set VS2 are also connected to a planetary gear carrier PT3 of the third front-mounted gear set VS3 when the fifth shift element E is engaged. In addition, the drive shaft 1 is connected to a sun gear SR3 of the third front-mounted gear set VS3. Further, a sun gear SR1 of the first front-mounted gear set VS1 is connected to a housing 3 of the multi-speed transmission when the first shift element A is engaged. Moreover, a planetary gear carrier PT1 of the first front-mounted gear set VS1 is rigidly connected to a ring gear HR2 of the second front-mounted gear set VS2 and to a ring gear HR3 of the third front-mounted gear set VS3. In addition, a ring gear HR1 of the first front-mounted gear set VS1 is connected to a planetary gear carrier PT2 of the second front-mounted gear set VS2, the ring gear HR1 of the first front-mounted gear set VS1 and the planetary gear carrier PT2 of the second front-mounted gear set VS2 being connected to the housing 3 when the fourth shift element D is engaged.

The first variant of the embodiment provides as a connection between the front-mounted gear sets VS1, VS2, VS3 and the rear-mounted gear sets NS1, NS2, as seen in FIG. 1, that the planetary gear carrier PT3 of the third front-mounted gear sets VS3 is connected to a sun gear SR5 of the second rear-mounted gear set NS2. It further provides that a sun gear SR4 of the first rear-mounted gear set NS1 is connected to the housing 3 when the third shift element C is engaged. In addition, a planetary gear carrier PT4 of the first rear-mounted gear set NS1 and a ring gear HR5 of the second rear-mounted gear set NS2 are connected to the output shaft 2. In addition, a ring gear HR4 is connected to a planetary gear carrier PT5 of the second front-mounted gear set NS2, the ring gear HR4 of the first front-mounted gear set NS1 and the planetary gear carrier PT5 of the second front-mounted gear set NS2 being connected to the drive shaft 1 when the sixth shift element F is engaged.

In FIG. 2, a second variant of the embodiment is shown, wherein in contrast to the first embodiment, the rear-mounted gear sets NS1, NS2 are designed as Simpson gear sets, resulting in significantly lower component stress in the rear-mounted gear sets NS1 and NS2. In the second variant of the embodiment, the front-mounted gear sets VS1, VS2, VS3 are designed just like in the first variant of the embodiment, i.e. regarding the description; reference can be made to the description of FIG. 1.

In addition, provision is made in the second variant of the embodiment that a planetary gear carrier PT3 of the third front-mounted gear set VS3 is connected to a ring gear HR5 of the second rear-mounted gear set NS2. Further, a sun gear SR4 of the first rear-mounted gear set NS1 and a sun gear SR5 of the second rear-mounted gear set NS2 are connected to the housing 3 when the third shift element C is engaged. Moreover, a planetary gear carrier PT4 of the first rear-mounted gear set NS1 is connected to the output shaft 2. In addition, a ring gear HR4 of the first rear-mounted gear set NS1 is rigidly connected to a planetary gear carrier PT5 of the second rear-mounted gear set NS2, the ring gear HR4 of the first rear-mounted gear set NS1 and the planetary gear carrier PT5 of the second rear-mounted gear set NS2 being connected to the drive shaft 1 when the sixth shift element F is engaged.

FIG. 3 shows a third variant of the multi-speed transmission, in which the first two front-mounted gear sets VS1, VS2 are designed as Simpson gear sets, resulting in significantly lower component stress in the front-mounted gear sets in comparison to the first two variants. The two rear-mounted gear sets NS1, NS2 are designed just like in the second variant of the embodiment and are therefore also designed as Simpson gear sets. The corresponding description can therefore be taken from the second variant of the embodiment.

Regarding the front-mounted gear sets VS1 and VS2, provision is made in the third variant of the embodiment according to FIG. 3, that the drive shaft 1 is connected to a ring gear HR2 of the second front-mounted gear set VS2 when the second shift element B is closed, wherein the ring gear HR2 of the second front-mounted gear set VS2 and the drive shaft 1 are also connected to a planetary gear carrier PT3 of the third front-mounted gear set VS3 when the fifth shift element E is engaged. In addition, the drive shaft 1 is connected to a sun gear SR3 of the third front-mounted gear set VS3. Further, a sun gear SR1 of the first front-mounted gear set VS1 and a sun gear SR2 of the second front-mounted gear set VS2 are connected to a housing 3 of the multi-speed transmission when the first shift element A is engaged. Moreover, a planetary gear carrier PT1 of the first front-mounted gear set VS1 is connected to a ring gear HR3 of the third front-mounted gear set VS3. In addition, a ring gear HR1 of the first front-mounted gear set VS1 is connected to a planetary gear carrier PT2 of the second front-mounted gear set VS2, the ring gear HR1 of the first front-mounted gear set VS1 and the planetary gear carrier PT2 of the second front-mounted gear set VS2 being connected to the housing 3 when the fourth shift element D is engaged.

A shift diagram of the gear set diagrams of the multi-speed transmission according to the invention as shown in FIGS. 1 to 3 is shown in FIG. 4 by way of example. The shift diagram indicates which shift elements A, B, C, D, E, F are engaged or closed to implement the individual gear stage. Further, the relevant ratio, efficiency and relevant gear increment are indicated in the shift diagram.

In the multi-speed transmission according to the invention, the first forward gear G1 is short geared, i. e. it has a high gear ratio and can thus be used as a creep mode. Further, the seventh forward gear G7 is designed as a direct gear. Depending on the application, the multi-speed transmission can be designed having twelve forward gears G1 to G12 at standard gear spacing and one reverse gear can be implemented or it is also conceivable that, as mentioned above, eleven forward gears at standard gear spacing, one creep mode and one reverse gear are provided. Further, eleven gears at optimized gear spacing can be implemented by omitting the third highest gear. By omitting the second highest and the fourth highest gears, 10 gears having constant gear spacing in the upper speeds can be designed.

In detail, the shift diagrams, shown by way of example, show that the second shift element B, the third shift element C, and the fourth shift element D are engaged to achieve a reverse gear R. To achieve a first forward gear G1, the third shift element C, the fourth shift element D and the fifth shift element E are engaged. To achieve a second forward gear G2, the first shift element A, the third shift element C and the fourth shift element D are engaged. To achieve a third forward gear G3, the first shift element A, the third shift element C and the fifth shift element E are engaged. To achieve a fourth forward gear G4, the first shift element A, the second shift element B and the third shift element C are engaged. To achieve a fifth forward gear G5, the second shift element B, the third shift element C and the fifth shift element E are engaged. To achieve a sixth forward gear G6, the third shift element C, the fifth shift element E and the sixth shift element F are engaged. To achieve a seventh forward gear G7, the second shift element B, the fifth shift element E and the sixth shift element F are engaged. To achieve an eighth forward gear G8, the first shift element A, the second shift element B and the sixth shift element F are engaged. To achieve a ninth forward gear G9, the first shift element A, the fifth shift element E and the sixth shift element F are engaged. To achieve a tenth forward gear G10, the first shift element A, the fourth shift element D and the sixth shift element F are engaged. To achieve an eleventh forward gear G11, the fourth shift element D, the fifth shift element E and the sixth shift element F are engaged and to achieve a twelfth forward gear G12, the second shift element B, the fourth shift element D and the sixth shift element F are engaged.

As can further be seen from the shift diagrams, to achieve a first alternative of the sixth forward gear G6, the first shift element A, the third shift element C and the sixth shift element F are engaged. To achieve a second alternative of the sixth forward gear G6, the second shift element B, the third shift element C and the sixth shift element F are engaged. To achieve a third alternative of the sixth forward gear G6, the third shift element C, the fourth shift element D and the sixth shift element F are engaged.

Thus, three of the shift elements A, B, C, D, E, F are engaged to achieve any gear.

At idle or in neutral N, preferably the third shift element C and the fourth shift element D are engaged. This results in the advantage that only one further shift element has to be engaged to achieve the reverse gear R or a forward gear.

REFERENCE NUMERALS 1 drive shaft
2 output shaft
3 housing
4 torque converter
VS1 first front-mounted gear set
VS2 second front-mounted gear set
VS3 third front-mounted gear set
NS1 first rear-mounted gear set
NS2 second rear-mounted gear set
G1 first forward gear
G2 second forward gear
G3 third forward gear
G4 fourth forward gear
G5 fifth forward gear
G6 sixth forward gear
G7 seventh forward gear
G8 eighth forward gear
G9 ninth forward gear
G10 tenth forward gear
G11 eleventh forward gear
G12 twelfth forward gear
R reverse gear
N Neutral or idle
A first shift element as a brake
B second shift element as a clutch
C third shift element as a brake
D fourth shift element as a brake
E fifth shift element as a clutch
F sixth shift element as a clutch
SR1 sun gear of the first front-mounted gear set
PT1 planetary gear carrier of the first front-mounted gear set
HR1 ring gear of the first front-mounted gear set
SR2 sun gear of the second front-mounted gear set
PT2 planetary gear carrier of the second front-mounted gear set
HR2 ring gear of the second front-mounted gear set
SR3 sun gear of the third front-mounted gear set
SR3 planetary gear carrier of the third front-mounted gear set
HR3 ring gear of the third front-mounted gear set
SR4 sun gear of the first rear-mounted gear set
PT4 planetary gear carrier of the first rear-mounted gear set HR4 ring gear of the first rear-mounted gear set
SR5 sun gear of the second rear-mounted gear set
PT5 planetary gear carrier of the second rear-mounted gear set
HR5 ring gear of the second rear-mounted gear set

The invention claimed is:

1. A multi-speed transmission comprising:
a drive shaft;
an output shaft;
a housing;
a first front-mounted gear set, a second front-mounted gear set and a third front-mounted gear set, a first rear-mounted gear set and a second rear-mounted gear set, each of the first, the second and the third front-mounted gearsets and the first and the second rear-mounted gearsets being designed as planetary gear sets and comprising a sun gear, a planetary gear carrier supporting at least one planetary gear and a ring gear;
first, second, third, fourth, fifth and sixth shift elements, selective engagement of the first, the second, the third, the fourth, the fifth and the sixth shift elements selectively rendering a drive speed of the drive shaft and speeds generated in the first, the second and the third front-mounted gear sets to achieve at least twelve forward gears and at least one reverse gear via at least one of the first and the second rear-mounted gear sets transmissible as an output speed to the output shaft;
the first, the second, the fifth and the fourth shift elements being assigned to the first, the second and the third front-mounted gear sets, and the third and the sixth shift elements being assigned to the first and the second rear-mounted gear sets;
at least one of the first, the second and the third front-mounted gear sets being rigidly connected to an element of the first and the second rear-mounted gear sets, resulting in six different output speeds of the first, the second and the third front-mounted gear sets being transmissible to at least one of the first and the second rear-mounted gear sets, and, if normalized to the input speed of the drive shaft, one of the six different output speeds is smaller than 0, four of the six different output speeds are between 0 and 1, and one of the six different output speeds is equal to 1; and
when the second shift element is engaged, the drive shaft is connected to the sun gear of the second front-mounted gear set;
when the fifth shift element is engaged, the sun gear of the second front-mounted gear set is connected to the planetary gear carrier of the third front-mounted gear set;
the drive shaft is connected to the sun gear of the third front-mounted gear set;
when the first shift element is engaged, the sun gear of the first front-mounted gear set is connected to the housing of the transmission;
the planetary gear carrier of the first gear set is rigidly connected to the ring gear of the second front-mounted gear set and to the ring gear of the third front-mounted gear set;
the ring gear of the first front-mounted gear set is connected to the planetary gear carrier of the second front-mounted gear set; and
when the fourth shift element is engaged, the ring gear of the first front-mounted gear set and the planetary gear carrier of the second front-mounted gear set are connected to the housing.

2. The multi-speed transmission according to claim 1, wherein the first shift element is assigned as a brake, the second shift element is assigned as a clutch, the fourth shift element is assigned as a brake and the fifth shift element is assigned as a clutch to the first, the second and the third front-mounted gear sets, and the third shift element is assigned as a brake and the sixth shift element is assigned as a clutch to the first and the second rear-mounted gear sets.

3. The multi-speed transmission according to claim 1, wherein two of the first, the second and the third front-mounted gear sets are designed as 2-carrier 4-shaft gears and one of the first, the second and the third front-mounted gear set is designed as a single gear set and the first and the second rear-mounted gear sets are designed as 2-carrier 4-shaft gears.

4. The multi-speed transmission according to claim 1, wherein the first front-mounted gear set and the second front-mounted gear set are designed as 2-carrier 4-shaft gears and the third front-mounted gear set is designed as a single gear set, to which one of the first and the second rear-mounted gear sets is rigidly connected.

5. The multi-speed transmission according to claim 1, wherein
the planetary gear carrier of the third front-mounted gear set is connected to the sun gear of the second rear-mounted gear set;
when the third shift element is engaged, the sun gear of the first rear-mounted gear set is connected to the housing;
the planetary gear carrier of the first rear-mounted gear set and the ring gear of the second rear-mounted gear set are connected to the output shaft;
the ring gear of the first rear-mounted gear set is connected to the planetary gear carrier of the second rear-mounted gear set; and
when the sixth shift element is engaged, the ring gear of the first rear-mounted gear set and the planetary gear carrier of the second rear-mounted gear set are connected to the drive shaft.

6. The multi-speed transmission according to claim 1, wherein
the planetary gear carrier of the third front-mounted gear set is connected to the ring gear of the second rear-mounted gear set;
when the third shift element is engaged, the sun gear of the first rear-mounted gear set and the sun gear of the second rear-mounted gear set are connected to the housing;
the planetary gear carrier of the first rear-mounted gear set is connected to the output shaft;
the ring gear of the first rear-mounted gear set is rigidly connected to the planetary gear carrier of the second rear-mounted gear set; and
when the sixth shift element is engaged, the ring gear of the first rear-mounted gear set and the planetary gear carrier of the second rear-mounted gear set are connected to the drive shaft.

7. A multi-speed transmission comprising:
a drive shaft;
an output shaft;
a housing;
a first front-mounted gear set, a second front-mounted gear set and a third front-mounted gear set, a first rear-mounted gear set and a second rear-mounted gear set, each of the first, the second and the third front-mounted gearsets and the first and the second rear-mounted gearsets being designed as planetary gear sets and comprising a sun gear, a planetary gear carrier supporting at least one planetary gear and a ring gear;

first, second, third, fourth, fifth and sixth shift elements, selective engagement of the first, the second, the third, the fourth, the fifth and the sixth shift elements selectively rendering a drive speed of the drive shaft and speeds generated in the first, the second and the third front-mounted gear sets to achieve at least twelve forward gears and at least one reverse gear via at least one of the first and the second rear-mounted gear sets transmissible as an output speed to the output shaft;

the first, the second, the fifth and the fourth shift elements being assigned to the first, the second and the third front-mounted gear sets, and the third and the sixth shift elements being assigned to the first and the second rear-mounted gear sets ;

at least one of the first, the second and the third front-mounted gear sets being rigidly connected to an element of the first and the second rear-mounted gear sets, resulting in six different output speeds of the first, the second and the third front-mounted gear sets being transmissible to at least one of the first and the second rear-mounted gear sets, and, if normalized to the input speed of the drive shaft, one of the six different output speeds is smaller than 0, four of the six different output speeds are between 0 and 1, and one of the six different output speeds is equal to 1; and when the second shift element is engaged, the drive shaft is connected to a ring gear of the second front-mounted gear set;

when the fifth shift element is engaged, the ring gear of the second front-mounted gear set are connected to the planetary gear carrier of the third front-mounted gear set;

the drive shaft is connected to the sun gear of the third front-mounted gear set;

when the first shift element is engaged, the sun gear of the first front-mounted gear set and the sun gear of the second front-mounted gear set are connected to the housing of the transmission;

the planetary gear carrier of the first gear set is rigidly connected to the ring gear of the third front-mounted gear set;

the ring gear of the first front-mounted gear set is connected to the planetary gear carrier of the second front-mounted gear set; and when the fourth shift element is engaged, the ring gear of the first front-mounted gear set and the planetary gear carrier of the second front-mounted gear set are connected to the housing.

8. A multi-speed transmission comprising:
a drive shaft;
an output shaft;
a housing;
a first front-mounted gear set, a second front-mounted gear set and a third front-mounted gear set, a first rear-mounted gear set and a second rear-mounted gear set, each of the first, the second and the third front-mounted gearsets and the first and the second rear-mounted gearsets being designed as planetary gear sets and comprising a sun gear, a planetary gear carrier supporting at least one planetary gear and a ring gear;

first, second, third, fourth, fifth and sixth shift elements, selective engagement of the first, the second, the third, the fourth, the fifth and the sixth shift elements selectively rendering a drive speed of the drive shaft and speeds generated in the first, the second and the third front-mounted gear sets to achieve at least twelve forward gears and at least one reverse gear via at least one of the first and the second rear-mounted gear sets transmissible as an output speed to the output shaft;

the first, the second, the fifth and the fourth shift elements being assigned to the first, the second and the third front-mounted gear sets, and the third and the sixth shift elements being assigned to the first and the second rear-mounted gear sets;

at least one of the first, the second and the third front-mounted gear sets being rigidly connected to an element of the first and the second rear-mounted gear sets, resulting in six different output speeds of the first, the second and the third front-mounted gear sets being transmissible to at least one of the first and the second rear-mounted gear sets, and, if normalized to the input speed of the drive shaft, one of the six different output speeds is smaller than 0, four of the six different output speeds are between 0 and 1, and one of the six different output speeds is equal to 1;

the second shift element, the third shift element and the fourth shift element are engaged to implement a reverse gear;

the third shift element, the fourth shift element and the fifth shift element are engaged to implement a first forward gear;

the first shift element, the third shift element and the fourth shift element are engaged to implement a second forward gear;

the first shift element, the third shift element and the fifth shift element are engaged to implement a third forward gear;

the first shift element, the second shift element and the third shift element are engaged to implement a fourth forward gear;

the second shift element, the third shift element and the fifth shift element are engaged to implement a fifth forward gear;

a sixth forward gear is achievable by engagement of the third shift element, the fifth shift element and the sixth shift element;

the second shift element, the fifth shift element and the sixth shift element are engaged to implement a seventh forward gear;

the first shift element, the second shift element and the sixth shift element are engaged to implement an eighth forward gear;

the first shift element, the fifth shift element and the sixth shift element are engaged to implement a ninth forward gear;

the first shift element, the fourth shift element and the sixth shift element are engaged to implement a tenth forward gear;

the fourth shift element, the fifth shift element and the sixth shift element are engaged to implement an eleventh forward gear; and the second shift element, the fourth shift element and the sixth shift element are engaged to implement a twelfth forward gear.

9. The multi-speed transmission according to claim 8, wherein the sixth forward gear is achievable by engagement of the first shift element, the third shift element and the sixth shift element.

10. The multi-speed transmission according to claim 8, wherein the sixth forward gear is achievable by engagement of the second shift element, the third shift element and the sixth shift element.

11. The multi-speed transmission according to claim 8, wherein the sixth forward gear is achievable by engagement of the third shift element, the fourth shift element and the sixth shift element.

* * * * *